United States Patent Office 2,777,791
Patented Jan. 15, 1957

2,777,791

COMPOSITIONS AND METHOD FOR COMBATING BACTERIAL AND FUNGAL INFECTIONS IN PLANTS

Frederick C. Visor, Jericho, George L. McNew, Hastings on Hudson, George Koch, Jamaica, and Alvaro Goenaga, New York, N. Y., assignors to Chas. Pfizer & Co., Inc., Brooklyn, N. Y., a corporation of Delaware No Drawing. Application June 14, 1954,
Serial No. 436,694

9 Claims. (Cl. 167—16)

This invention relates to compositions useful in controlling or combating plant disease and, more particularly, to compositions which are highly active against both the bacterial and fungal classes of plant pathogens. These two classes of pathogens account for the major proportion of losses due to disease in the field of agriculture today.

In a copending application, Serial No. 400,100, of Tate, filed December 23, 1953, there are described antibacterial compositions comprising a streptomycin-type antibiotic and a tetracycline-type antibiotic, which are particularly effective in combating various bacterial diseases of plants. However, compositions containing only such antibiotics as the active ingredients normally have little effect against plant diseases of fungal origin unless they are applied or combined with suitable agricultural fungicides.

It has now been found that compositions possessing both anti-fungal activity and enhanced anti-bacterial activity can be provided by combining a streptomycin-type antibiotic or a mixture of a streptomycin-type and a tetracycline-type antibiotic, with a substantially water-insoluble copper fungicide which not only exerts anti-fungal activity, but also confers a high order of synergistic activity on the antibiotics. Such compositions possess the important advantage of providing a highly effective means for combating, in one application, both fungal and bacterial infections of plants. Moreover, the synergism exerted by this class of fungicides permits significant reduction in the antibiotic content of the compositions described in the aforesaid co-pending application, thereby providing other advantages, such as savings in cost, the antibiotics being much more expensive than the fungicides employed.

Streptomycin is the name applied to a well-known antibiotic metabolism product of Streptomyces griseus, a microorganism generally found in soils. This antibiotic and its method of preparation is plentifully described in the literature. See for example Waksman: "Microbial antagonisms and antibiotic substances," New York, The Commonwealth Fund, 1947, p. 193–200. For the purposes of the present invention the expression, "a streptomycin-type antibiotic" will refer generically to the streptomycin itself as well as its antibiotically active compounds and derivatives, such as the sulfate, hydrochloride, calcium chloride complex, the dihydro product, dihydrostreptomycin, dihydrostreptomycin sulfate, hydrochloride, etc. The expression "a streptomycin antibiotic" refers to free streptomycin, its compounds and/or salts, except when otherwise indicated.

According to the present invention, mixtures of a streptomycin-type antibiotic and a substantially water-insoluble copper fungicide are effective in combating a wide variety of plant infections of bacterial and fungal origin. For this purpose, the fungicide is employed in an amount sufficient to provide from about 1 to 40 parts copper content by weight of the antibiotic content of the composition (on an activity basis), thereby achieving the desired degree of anti-fungal activity and synergism of the streptomycin. In preparing such compositions, the pure crystalline streptomycin and dihydrostreptomycin bases are taken as standards with potencies of 1000 mcg./mg. each, the proportion of the streptomycin-type antibiotic employed being calculated in terms of the pure standard forms. A particularly useful composition is one containing one part streptomycin sulfate in combination with a sufficient amount of copper fungicide to furnish a copper content of about 20 parts by weight. Such compositions are effective against a variety of bacteria and in some instances may even suppress the development of resistant strains of bacteria which occasionally develop upon prolonged administration of streptomycin. However, it is preferred to control the development of resistant strains by adding to the compositions a tetracycline-type antibiotic in an amount sufficient to suppress the emergence of such strains.

Tetracycline is a recently discovered antibiotic characterized by a tetracyclic aromatic nucleus, also common to oxytetracycline and chlortetracycline. Oxytetracycline and chlortetracycline structurally differ from one another and from tetracycline primarily in that oxytetracycline contains a nuclear hydroxy group that neither tetracycline nor chlortetracycline possesses, while chlortetracycline contains a nuclear chlorine atom that neither oxytetracycline nor tetracycline possesses. Oxytetracycline can be recovered from the metabolism products of Streptomyces rimosus, as more fully described in U. S. Patent 2,516,080 to Sobin et al., issued July 18, 1950 and referring to the antibiotic by its trade mark "Terramycin." Chlortetracycline in turn can be recovered from the metabolism products of Streptomyces aureofaciens, as described in U. S. Patent 2,482,055 to Duggar, issued September 13, 1949 and referring to the antibiotic by its trademark "Aureomycin." Tetracycline is readily produced by the catalytic dehalogenation of chlortetracycline, or it can also be produced directly by fermentation methods from selected strains of microorganisms of the genus Streptomyces.

In this specification and in the claims the expression, "a tetracycline-type antibiotic" means an antibiotic having a chemical structure characterized by a tetracycline nucleus and refers not only to pure or free oxytetracycline, chlortetracycline and tetracycline, but also to their antibiotically active derivatives, in which form they are or can be used. Such derivatives include calcium chloride combination products, hydrochlorides, sodium and potassium salts, quaternary ammonium salts and the like. Similarly, the expression "oxytetracycline antibiotic" refers not only to free oxytetracycline but also to such derivatives, combination products and/or salts, except where otherwise indicated.

The streptomycin-type antibiotic is advantageously employed as the principal antibiotic ingredient in the compositions of this invention, with the tetracycline-type antibiotic advantageously added in an amount sufficient to suppress the development of resistant strains of bacterial pathogens, as previously indicated. A proportion of the tetracycline-type antibiotic, from about 0.5% to 25%, preferably about 10% by weight of the total active antibiotic content of the mixture, is generally adequate for this purpose. In general, one part of streptomycin-type antibiotic is combined with from about .005 to 0.25 parts of the tetracycline-type antibiotic and with sufficient fungicide to provide about 1 to 40 parts copper content by weight of the active antibiotic content, thereby furnishing compositions having both antifungal and enhanced anti-bacterial activity. As previously indicated, the proportion of the streptomycin-type antibiotic is calculated on an activity basis. The proportion of the tetracycline-type antibiotic is similarly expressed, the pure crystalline amphoteric forms of tetracycline, oxytetracycline and chlortetracycline being taken as standards with potencies of 1000 mcg./mg. each.

A wide variety of substantially water-insoluble copper fungicides are useful in the preparation of the described copper compositions. Thus, one may employ the basic copper sulfates, including the basic copper-calcium sulfates; the basic chlorides, including copper oxychloride; copper oxides, particularly cuprous oxide; and even the silicates, phosphates, nitrates and zeolites. The free or water-soluble forms of copper are to be avoided in view of the toxic effects that such compounds exert upon the plants. Accordingly, the ordinary water-soluble forms of copper such as the sulfates, chlorides, nitrates and the like, are converted to a fixed or insoluble form by treatment with various basic substances, such as lime, sodium carbonate and ammonia to form complexes and/or addition products which render such salts innocuous to plant tissue in the concentrations employed.

The basic copper sulfates which are employed in accordance with this invention may be represented by the following general formula: $[Cu(OH)_2]_xCuSO_4$, $x$ being an integer such as 3, 4 or 9. Tribasic copper sulfate, i. e. $[Cu(OH)_2]_3CuSO_4$, is particularly useful in this connection. These are forms of Bordeaux mixture, prepared by the interaction of calcium oxide or hydroxide with copper sulfate in an aqueous medium. For this purpose the ratio of copper sulfate to calcium oxide may vary from 1:0.166 to 1:1, the higher proportion of lime having been reported to produce basic copper-calcium sulfates of a more complex nature, such as $$[Cu(OH)_2]_9Ca(OH)_2CuSO_4$$

and $[Cu(OH)_2]_9CuSO_4[Ca(OH)_2]_3CaSO_4$; however, it is understood that the present invention is not bound to any specific formulae of this nature. Tribasic copper sulfate is formed when less than 0.75 equivalent of calcium hydroxide has been added to one equivalent of copper sulfate. This material is available commercially in preparations containing approximately 53% metallic copper as basic copper sulfate. It is preferred to employ the foregoing fungicides in dry form, which, after incorporation with the antibiotic, may be subsequently diluted with water.

As previously pointed out, copper sulfate may also be rendered substantially water-insoluble by treatment with sodium carbonate or ammonia. The reaction between copper sulfate and sodium carbonate results in the formation of a basic carbonate, $[Cu(OH)_2]_3(CuCO_3)_2$, and carbon dioxide which combines with sodium sulfate, and the sodium carbonate to form the bicarbonate, $NaHCO_3$. This product is variously known as Burgundy mixture or soda Bordeaux. In some instances sodium bicarbonate may be used in place of the sodium carbonate. When ammonium hydroxide is added in lieu of the sodium carbonate or bicarbonate various useful cuprammonium complexes are obtained.

The basic copper chlorides or oxychlorides are also particularly suitable for use in the present invention, these compounds being represented by the formula $$[Cu(OH)_2]_xCuCl_2$$

wherein $x$ may be 3 or 4. Mixtures of the foregoing are also highly advantageous, a preferred mixture being provided by copper oxychloride, $[Cu(OH)_2]_3CuCl_2 \cdot 4H_2O$ combined with tribasic copper sulfate, $[Cu(OH)_2]_3CuSO_4$ and sold under the trade name "COCS." This product contains approximately 55% metallic copper as basic sulfates and chlorides.

Cuprous oxide, $Cu_2O$, normally red in color, and cupric oxide, $CuO$, which is black, are also advantageously employed in the antibiotic compositions of this invention, cuprous oxide being preferred as between the two forms.

The color of the cuprous oxide may range from red through yellow and orange to green, depending upon the particle size. Yellow cuprous oxide is a very finely divided form which is especially useful. Such a product is commercially available under the trade name "Cuprocide," which contains approximately 90% yellow cuprous oxide or 67% copper.

Another useful copper fungicide is copper ammonium silicate, a complex prepared by reacting approximately 5 parts of sodium silicate with one part of ammonium hydroxide. The copper zeolites or complex copper aluminosilicates are somewhat similar, being prepared from sodium silicate, sodium aluminate (or aluminum sulfate), and copper sulfate.

The synergistic activity exerted by copper fungicides on streptomycin-type antibiotics was determined in a series of foliage tests in which bean plants were treated with streptomycin sulfate and basic copper chloride-sulfates ("COCS"), separately, and in various combinations thereof. The streptomycin antibiotic was applied in a concentration of 175 p. p. m., well under the concentration necessary to provide effective disease control under the severe conditions of the tests. The basic copper chloride-sulfate in turn was applied in amounts sufficient to provide copper concentrations of 75, 440 and 2640 p. p. m., also well below the level necessary to provide any degree of bacterial control under the test conditions. After the spray had dried, each of the plants was bruised lightly on four leaves with a pointed instrument which provided 100 receptor sites for possible infection. Thereafter, a broth culture of Xanthomonas phaseoli diluted 1 to 4 was atomized on all plants until the leaves were thoroughly wetted, thereby subjecting each of the receptor sites to bacterial infection. Seven days later the plants were examined for infection on the injured cotyledonary leaves to determine the degree of infection as evidenced by the appearance of characteristic spots at the receptor sites. The average percentage of infection and the percentage control of infection was determined for the four leaves of each plant under treatment. The results of these tests are indicated below in Table I.

TABLE I

Synergism between streptomycin and basic copper chloride-sulfate ("COCS")

| Streptomycin Conc., p. p. m. | Percent Control at Copper Conc. (p. p. m.) as basic sulfates and chlorides | | | |
|---|---|---|---|---|
| | 0 | 75 | 440 | 2,640 |
| 0 | 0 | 3 | 9 | 10 |
| 175 | 11 | 18 | 49 | 97 |

As indicated in the above table, with no streptomycin, only 3, 9 and 10% control was obtained at the levels of COCS tested and only 11% control was obtained with 175 p. p. m. of streptomycin alone. However, 175 p. p. m. streptomycin with 440 and 2640 p. p. m. of copper (as "COCS") resulted in a control of bacterial infection far above that which could be predicted or expected from the activities of the two ingredients separately tested. In fact, almost complete control was obtained with 175 p. p. m. of streptomycin and 2640 p. p. m. of copper content. Thus, the basic copper chloride-sulfate clearly synergized the antibiotic activity of the streptomycin.

A similar series of tests were conducted with basic copper chloride-sulfate (COCS), cuprous oxide (Cuprocide) and tribasic copper sulfate to determine the effect of such fungicides upon a preferred anti-bacterial composition containing streptomycin sulfate and the quaternary ammonium salt of oxytetracycline in the relative proportions of 250 p. p. m. streptomycin to 25 p. p. m.

oxytetracycline. The percent control of bean blight (*Xanthamonas phaseoli*) provided by these agents both alone and in combination is set forth in Table II.

Table II

Synergism between copper fungicides, streptomycin and oxytetracycline

| Fungicide | Fungicide Conc., g. per l. | Percent Control at Conc. | |
|---|---|---|---|
| | | 0 p. p. m. Streptomycin, 0 p. p. m. Oxytetracycline | 250 p. p. m. Streptomycin, 25 p. p. m. Oxytetracycline |
| Control | 0 | 0 | 7 |
| Cuprocide (67% Cu) | 1.8 | 12 | 52 |
| COCS (55% Cu) | 4.8 | 36 | 100 |
| Tribasic Copper Sulfate (53% Cu) | 4.8 | 0 | 72 |

As shown in Table II, each of the fungicides tested provided a low degree of control of the bacterial infection when employed alone, as was the case with the antibiotic composition when tested in the absence of the fungicides. However, while Cuprocide alone provided only 12% control and the antibiotics alone only 7%, the combination thereof resulted in 52% control, considerably in excess of any additive effect which might be anticipated. On the other hand, the COCS resulted in dramatic synergism of the antibiotic composition, giving 100% control with the antibiotics, whereas alone, it produced only 36% control. The result obtained with tribasic copper sulfate was also startling in view of the fact that no control was observed with the fungicide alone, but when it was combined with the antibiotics, the degree of control jumped from 7% to 72%.

While the aforesaid antibiotics and fungicides may be combined in the proportions indicated and used in pure form, i. e. without the addition of other ingredients, they are preferably incorporated with carriers and/or diluents to facilitate application in the control of plant disease. In particular, they may be prepared in the form of sprays, emulsions, dusting powders, concentrates and the like wherein the active ingredients may range from less than 1% to as high as 95% by weight of the compositions. It is particularly preferred to employ the compositions of this invention in the form of aqueous sprays or dispersions, which are readily prepared by incorporating the antibiotic and fungicide components with suitable wetting agents, preferably non-ionic wetting agents in powder form. Examples of such wetting agents are "Pluronic F68" (ethylene oxide-polyoxypropylene base), "Triton X100" (an alkylated aryl polyether alcohol), "Igepal" (an alkyl aryl polyethylene glycol ether), and "Emulfor" (polyethylene ethers of long chain fatty acids and alcohols); compatible liquid wetting agents can also be employed by adsorbing them on inert carriers for blending purposes. It is also desirable to employ an acidic material in such formulations, preferably an organic acid such as citric acid or tartaric acid, although inorganic acids such as hydrochloric acid are also suitable in some instances. The acid is generally employed in an amount sufficient to maintain the pH of the final solution below 7, thereby stabilizing the resulting compositions. In preparing aqueous sprays, these materials are advantageously mixed to form a dry powder which may be diluted to the proper concentration with water immediately prior to application to the plants or trees to be sprayed. In some instances, inert, non-adsorbing carriers may be used in such powders or concentrates as diluents to facilitate proper proportioning of the ingredients and to prevent moisture absorption by the antibiotics. Suitable carriers include pyrophylite, an aluminum silicate sold under the trademark "Pyrax ABB," Barden clay, Perry clay and diatomaceous earth. Dusting powders can, of course, be prepared with these same materials.

The amount and concentration of the compositions of this invention to be employed against a particular plant disease or to be employed for general disease control, will, of course, vary considerably. The type of plant or tree, the type of disease involved, the time of year, weather conditions and the stage of development of the plant or tree are among the many factors which must be considered in this respect. Generally, however, it is preferred to apply the streptomycin-type antibiotic in concentrations of from about 20 to 200 p. p. m., combined, if desired, with the tetracycline-type antibiotic in concentrations of from about 2 to 20 p. p. m. and with the fungicide in concentrations sufficient to provide from about 20 to 8000 p. p. m. copper content. Again the antibiotic concentrations are expressed on an activity basis. The use of concentrates is especially advantageous in providing compositions which are readily diluted with water to form sprays containing the above described active ingredients in approximately the proportions set forth.

A particularly useful concentrate which may be employed in this manner is set forth below:

EXAMPLE I

| | Grams |
|---|---|
| Streptomycin sulfate (600 mcg./mg. potency) | 16.69 |
| Oxytetracycline quaternary ammonium salt (460 mcg./mg. potency) | 2.16 |
| "COCS" | 1816.00 |
| Pluronic F68 | 20.00 |
| Citric acid | 5.50 |

This composition may be diluted with 100 gallons of water to provide an excellent spray effective against both bacterial and fungal diseases of plants, the active ingredients being present in an amount of approximately 26 p. p. m. streptomycin, 2.6 p. p. m. oxytetracycline and 2640 p. p. m. copper as COCS. Under ordinary circumstances, the pH of the spray solution should be within the range of about 5.5 to 6.0.

Another advantageous formulation is as follows:

EXAMPLE II

| | Grams |
|---|---|
| Streptomycin sulfate (600 mcg./mg. potency) | 33.38 |
| Oxytetracycline quaternary ammonium salt (460 mcg./mg. potency) | 3.33 |
| Cuprocide | 681.00 |
| Triton X100 | 20.00 |
| Citric acid | 5.50 |
| Pyrax ABB | 164.79 |

This composition when diluted with 100 gallons of water will also provide an excellent spray containing approximately 52 p. p. m. streptomycin, 5.2 p. p. m. oxytetracycline, and 1206 p. p. m. copper as $Cu_2O$.

Still another highly effective composition may be obtained by employing tribasic copper sulfate, as in the following:

EXAMPLE III

| | Grams |
|---|---|
| Streptomycin sulfate (600 mcg./mg. potency) | 50.07 |
| Oxytetracycline quaternary ammonium salt (460 mcg./mg. potency) | 5.01 |
| Tribasic copper sulfate | 1816.00 |
| Pluronic F68 | 20.00 |
| Citric acid | 5.50 |

Upon dilution of the foregoing composition with 100 gallons of water, the resulting spray contains approximately 78 p. p. m. streptomycin, 7.8 p. p. m. oxytetracycline, and 2544 p. p. m. copper as tribasic copper sulfate.

Resort may be had to such modifications as fall within

What is claimed is:

1. A composition useful in combating bacterial and fungal diseases of plants, comprising as the principal active ingredients a streptomycin-type antibiotic and a substantially water-insoluble copper fungicide.

2. A composition useful in combating bacterial and fungal diseases of plants, comprising as the principal active ingredients one part of a streptomycin-type antibiotic, and a substantially water-insoluble copper fungicide in an amount sufficient to provide from about 1 to 40 parts of copper content by weight of the antibiotic content (on an activity basis).

3. A composition useful in combating bacterial and fungal diseases in plants, comprising as the principal active ingredients a streptomycin-type antibiotic, a tetracycline-type antibiotic and a substantially water-insoluble copper fungicide.

4. A composition useful in combating bacterial and fungal diseases in plants, comprising as the essential active ingredients one part of a streptomycin-type antibiotic, from about 0.005 to 0.25 parts of a tetracycline-type antibiotic, and a substantially water-insoluble copper fungicide in an amount sufficient to provide from about 1 to 40 parts of copper content by weight of the antibiotic content (on an activity basis).

5. The composition of claim 1 in which the said fungicide is tribasic copper sulfate.

6. The composition of claim 1 in which the said fungicide is cuprous oxide.

7. The composition of claim 1 in which the said fungicide is composed of basic copper chloride and tribasic copper sulfate.

8. An agricultural spray for inhibiting the growth of bacterial and fungal plant pathogens composed of an aqueous solution containing from about 20 to 200 p. p. m. of a streptomycin antibiotic, from about 2 to 20 p. p. m. of an oxytetracycline antibiotic, and a substantially water-insoluble copper fungicide in an amount sufficient to provide from about 20 to 8000 p. p. m. of copper content.

9. A method for combating bacterial and fungal infections in plants which comprises applying to the infection site a composition containing streptomycin, oxytetracycline and a substantially water-insoluble copper fungicide.

References Cited in the file of this patent

UNITED STATES PATENTS 2,099,623    Riley ---------------- Nov. 16, 1937

OTHER REFERENCES

Agrimycin, Unlisted Drugs, Oct. 31, 1953, p. 144.

Ark: "Effect of crystalline streptomycin on phytopathogenic bacteris and fungi," (Abstr.) Phytopath., vol. 37, 1947, p. 842.

Agricultural and Food Chem., vol. 1, No. 18, Nov. 25, 1953, p. 1102, "Plant Disease."

J. A. M. A., Sept. 15, 1951, pp. 253–258, esp. at p. 257, col. 1.

J. A. M. A., Feb. 23, 1952, pp. 600–602, esp. at p. 602, col. 1, first complete paragraph.

J. A. M. A, Jan 2, 1954, pp. 52–59, esp. at p. 55, col. 1, first paragraph.

Am. J. Pharmacy, February 1954, p. 69, "Oxytetracycline with streptomycin . . ."

Schneiderhan: "Preparation and Properties of Bordeaux Mixtures," Agr. Exp. Station, College of Agric., West Va. Univ., June 1933, 30 page brochure.